United States Patent
Dai et al.

(10) Patent No.: US 10,685,680 B2
(45) Date of Patent: *Jun. 16, 2020

(54) GENERATING VIDEOS OF MEDIA ITEMS ASSOCIATED WITH A USER

(71) Applicant: Google LLC, Mountain View, CA (US)

(72) Inventors: Shengyang Dai, Dublin, CA (US); Timothy Sepkoski St. Clair, Menlo Park, CA (US); Koji Ashida, Mountain View, CA (US); Jingyu Cui, Milpitas, CA (US); Jay Steele, Los Angeles, CA (US); Qi Gu, Redwood, CA (US); Erik Murphy-Chutorian, Palo Alto, CA (US); Ivan Neulander, Los Angeles, CA (US); Flavio Lerda, London (GB); Eric Charles Henry, San Francisco, CA (US); Shinko Yuanhsien Cheng, Cupertino, CA (US); Aravind Krishnaswamy, San Jose, CA (US); David Cohen, San Jose, CA (US); Pardis Beikzadeh, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/359,928

(22) Filed: Mar. 20, 2019

(65) Prior Publication Data
US 2019/0252001 A1 Aug. 15, 2019

Related U.S. Application Data

(63) Continuation of application No. 15/633,011, filed on Jun. 26, 2017, now Pat. No. 10,242,711, which is a
(Continued)

(51) Int. Cl.
*H04N 5/93* (2006.01)
*G11B 27/036* (2006.01)
(Continued)

(52) U.S. Cl.
CPC .......... *G11B 27/036* (2013.01); *G11B 27/034* (2013.01); *G11B 27/10* (2013.01);
(Continued)

(58) Field of Classification Search
CPC ..... G11B 27/034; G11B 27/036; G11B 27/10; G11B 27/105; G11B 27/28; G11B 27/34; H04N 5/2628; H04N 5/7605
(Continued)

(56) References Cited

U.S. PATENT DOCUMENTS

2006/0092487 A1 5/2006 Kuwabara et al.
2008/0123955 A1 5/2008 Yeh et al.
(Continued)

OTHER PUBLICATIONS

"Active_Sideshow_Pro", http://www.dmxzone.com/Downloads/Tutorial_ActSlideShowPro.zip/Active_Slideshow_PRO.pdf, Dec. 31, 2005, 20 pages.
(Continued)

*Primary Examiner* — Robert Chevalier
(74) *Attorney, Agent, or Firm* — IP Spring

(57) ABSTRACT

A method includes grouping media items associated with a user into segments based on a timestamp associated with each media item and a total number of media items. The method also includes selecting target media from the media items for each of the segments based on media attributes associated with the media item. The method also includes generating a video that includes the target media for each of the segments by generating a first animation that illustrates a first transition from a first item from the target media to a second item from the target media with movement of the
(Continued)

first item from an onscreen location to an offscreen location, wherein the first item is adjacent to the second item in the first animation and determining whether the target media includes one or more additional items. The method also includes adding a song to the video.

20 Claims, 7 Drawing Sheets

Related U.S. Application Data continuation of application No. 14/885,285, filed on Oct. 16, 2015, now Pat. No. 9,691,431.

(51) Int. Cl.
*G11B 27/034* (2006.01)
*G11B 27/10* (2006.01)
*H04N 5/76* (2006.01)
*G11B 27/34* (2006.01)
*G11B 27/28* (2006.01)
*H04N 5/262* (2006.01)

(52) U.S. Cl.
CPC ............ *G11B 27/105* (2013.01); *G11B 27/28* (2013.01); *G11B 27/34* (2013.01); *H04N 5/2628* (2013.01); *H04N 5/7605* (2013.01)

(58) Field of Classification Search
USPC ....... 386/241, 278, 280, 281, 282, 290, 239, 386/248
See application file for complete search history.

(56) References Cited

U.S. PATENT DOCUMENTS

| | | |
|---|---|---|
| 2011/0206284 A1 | 8/2011 | Das et al. |
| 2012/0044250 A1 | 2/2012 | Landers et al. |
| 2013/0195427 A1 | 8/2013 | Sathish |
| 2015/0268932 A1* | 9/2015 | Reblitz-Richardson ..................... G06F 7/36 707/752 |

OTHER PUBLICATIONS

European Patent Office, International Search Report for International Patent Application No. PCT/US2016/056313, dated Mar. 10, 2017, 10 pages.
European Patent Office, Written Opinion for International Patent Application No. PCT/US2016/056313, dated Mar. 10, 2017, 13 pages.
Hua, et al., "Photo2Video—A System for Automatically Converting Photographic Series Into Video", IEEE Transactions on Circuits and Systems for Video Technology, IEEE Service Center, Piscataway, NJ, vol. 16, No. 7, Jul. 1, 2006, pp. 803-819.
International Bureau of WIPO, International Preliminary Report on Patentability for International Patent Application No. PCT/US2016/056313, dated Apr. 17, 2018, 14 pages.
Li, et al., "Automatic Summarization for Personal Digital Photos", Information, Communications and Signal Processing, 2003 and Fourth Pacific Rim Conference on Multimedia; Proceedings from the 2003 Joint Conference of the Fourth International Conference in Singapore; Dec. 15-18, 2003; Piscataway, NJ, US, IEEE vol. 3, Dec. 15, 2003, pp. 1536-1540.
USPTO, Notice of Allowance for U.S. Appl. No. 14/885,285, dated Feb. 23, 2017, 9 pages.
USPTO, Non-final Office Action for U.S. Appl. No. 15/633,011, dated Jul. 23, 2018, 8 pages.
USPTO, Notice of Allowance for U.S. Appl. No. 15/633,011, dated Nov. 15, 2018, 8 pages

* cited by examiner

GENERATING VIDEOS OF MEDIA ITEMS ASSOCIATED WITH A USER

CROSS-REFERENCE TO RELATED APPLICATIONS

The present application is a continuation of U.S. patent application Ser. No. 15/633,011, filed Jun. 26, 2017 and titled GENERATING VIDEOS OF MEDIA ITEMS ASSOCIATED WITH A USER, which is a continuation of U.S. patent application Ser. No. 14/885,285, filed Oct. 16, 2015 and titled GENERATING VIDEOS OF MEDIA ITEMS ASSOCIATED WITH A USER (now U.S. Pat. No. 9,691,431), the contents of which are incorporated herein by reference in its entirety.

BACKGROUND

People enjoy looking at media items that they have previously posted on websites, such as social networking websites or video websites. Manual curation of media items into a video or compilation may not be scalable with large numbers of media. It may also be difficult to automatically select items from the media to use for a compilation. For example, some events may be overrepresented or underrepresented. In addition, depending on the number of media items associated with the user, it may be computationally expensive to process all the media items according to different media criteria.

SUMMARY

Implementations generally relate to media items and videos. In some implementations, a method to generate a video includes grouping media items associated with a user into segments based on a timestamp associated with each media item and a total number of media items. The method may further include selecting target media from the media items for each of the segments based on media attributes associated with the media item, wherein the target media includes two or more media items. The method may further include generating the video that includes the target media for each of the segments by: generating a first animation that illustrates a first transition from a first item from the target media to a second item from the target media with movement of the first item from an onscreen location to an offscreen location, wherein the first item is illustrated as being attached to the second item in the first animation, determining whether the target media includes one or more additional items, and responsive to determining that the target media includes one or more additional items, generating a second animation that illustrates a second transition from the second item to a first additional item and that further illustrates additional transitions between a remainder of the one or more additional items. The method may further include adding a song to the video, wherein one or more features of the song are synchronized with the first transition and the second transition.

In some implementations, the method may further include the timestamp being associated with each media item represents at least one of an upload time associated with uploading each media item, a capture time associated with capturing each media item, a creation time associated with creating each media item, and a last modification made to each media item. The method may further include selecting the media items from media associated with the user based on the timestamp being indicative of a particular time period. Generating the first animation may further include illustrating a zoom-out effect on the first item, wherein the zoom-out effect is synchronized to the one or more features of the song. The method may further include grouping the media item associated with the user into the plurality of segments by grouping media items associated with an event into two or more segments based on an event number of media items associated with the event as compared to the total number of media items. The method may further include selecting the target media from the media item for each of the plurality of segments based on the media attributes associated with the media item includes selecting based on a share tendency. The method may further include a number of target media being a function of the total number of media items as determined prior to the grouping of the media items.

In some implementations, a system to generate a video includes one or more processors coupled to a memory, a media selector module, and a video generation module. The media selector module may be stored in the memory and executable by the one or more processors to select target media from media items by, for each of the media items: randomly selecting a first rule from a plurality of rules, determining whether the media item satisfies the first rule, responsive to a determination that the media item does not satisfy the first rule, continuing to select a subsequent rule from the plurality of rules until the subsequent rule is satisfied or the plurality of rules are exhausted, and determining that the media item is a target media item if the media item satisfied the first rule or the subsequent rule. The video generation module may be stored in the memory, coupled to the media selector module, and executable by the one or more processors to generate the video that includes the target media.

In some implementations, the video generation module is configured to generate the video by: generating two or more animations, wherein each animation illustrates a transition between two media items of the target media items and arranging the two or more animations into a sequence. The system may further include a music module stored on the memory and executable by the one or more processors, the music module configured to add a song to the video and synchronize one or more features of the song with the transitions in the two or more animations. The media selector module may be configured to select the first rule from the plurality of rules that include two or more of an important entity rule, a landmark rule, a face frequency rule, a face affinity rule, and a highlights rule. The video generation module may be configured to generate a cover image that is target media that appears first in the video and wherein the video generation module identifies the cover image by determining whether the cover image satisfies at least the first rule and the subsequent rule.

In some implementations, the system may further include a user interface module stored on the memory and executable by the one or more processors, the user interface module configured to provide the user with a user interface that includes options for performing one or more of adding a user-specified media item to the target media, removing one or more media items from the target media, specifying an order of the target media in the video, specifying a title of the video, and selecting the song. The user interface module may also be configured to generate a preview of the video from at least one of the first item in the video and subsequent items in the video that are static images. The user interface module may also be configured to generate a link to a network location that, when selected by the user, provides the user with access to the video.

In some implementations, an apparatus to generate a video includes means for grouping media items associated with a user into segments based on a timestamp associated with each media item and a total number of media items, means for selecting target media from the media items for each of the segments based on media attributes associated with the media item, wherein the target media includes two or more media items, means for generating the video that includes the target media for each of the segments by: generating a first animation that illustrates a first transition from a first item from the target media to a second item from the target media with movement of the first item from an onscreen location to an offscreen location, wherein the first item is illustrated as being attached to the second item in the first animation, means for determining whether the target media includes one or more additional items, responsive to determining that the target media includes one or more additional items, means for generating a second animation that illustrates a second transition from the second item to a first additional item and that further illustrates additional transitions between a remainder of the one or more additional items, and means for adding a song to the video, wherein one or more features of the song are synchronized with the first transition and the second transition.

In some implementations, the apparatus may further include the timestamp being associated with each media item represents at least one of an upload time associated with uploading each media item, a capture time associated with capturing each media item, a creation time associated with creating each media item, and a last modification made to each media item. The apparatus may further include means for selecting the media items from media associated with the user based on the timestamp being indicative of a particular time period. Generating the first animation may further include means for illustrating a zoom-out effect on the first item, wherein the zoom-out effect is synchronized to the one or more features of the song. The apparatus may further include means for grouping the media item associated with the user into the plurality of segments by grouping media items associated with an event into two or more segments based on an event number of media items associated with the event as compared to the total number of media items. The apparatus may further include means for selecting the target media from the media item for each of the plurality of segments based on the media attributes associated with the media item includes selecting based on a share tendency. The apparatus may further include a number of target media being a function of the total number of media items as determined prior to the grouping of the media items.

Other aspects may include corresponding methods, systems, apparatus, and computer program products.

The system and methods described below advantageously generate videos of media items that a user is expected to enjoy viewing. In addition, by randomly selecting a rule to apply to media items instead of applying multiple rules at once, the system and methods increase the chances of creating an interesting video. By synchronizing the video with features of a song, such as beats of a song, the video may be more captivating to audiences. Lastly, the system and methods advantageously provide coverage of content spanning a long time period and reduce the computational cost of generating the video by selecting target media for each segment independently.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Some implementations may include a system and method to generate a video. Media items associated with a user may be grouped into segments based on a timestamp associated with each media item and a total number of media items. For example, if there are 72 photos available that are evenly distributed over a particular time period, the media items may be grouped into 12 segments where each segment includes six of the media items. Target media may be selected from the media items for each of the segments based on media attributes associated with the media item. For example, for each segment, two media items may be selected from the six media items available for that particular segment.

In some implementations, the target media may be selected based on applying a rule to each media item that is randomly selected from a plurality of rules. For example, the first rule selected may determine whether the media item includes an important entity, such as a birthday cake. If the media item does not satisfy the rule, a subsequent rule may be selected from the plurality of rules. For example, the subsequent rule may determine whether the media item includes several faces including the user's face. If there is no subsequent rule available, the process may proceed to a next media item. Alternatively, the target media may be selected based on a tendency of users to share the images.

A video may be generated that includes the target media for each of the segments. Generating the video may include generating a first animation that illustrates a first transition from a first item from the target media to a second item from the target media with movement of the first item from an onscreen location to an offscreen location, where the first item is adjacent to the second item in the first animation. In some implementations, the video may include additional transitions with additional items in additional animations.

In some implementations, a song may be added to the video where one or more features of the song are synchronized with the video. For example, beats of the song may be synchronized with the transitions in the video.

Example System

Figure 1:
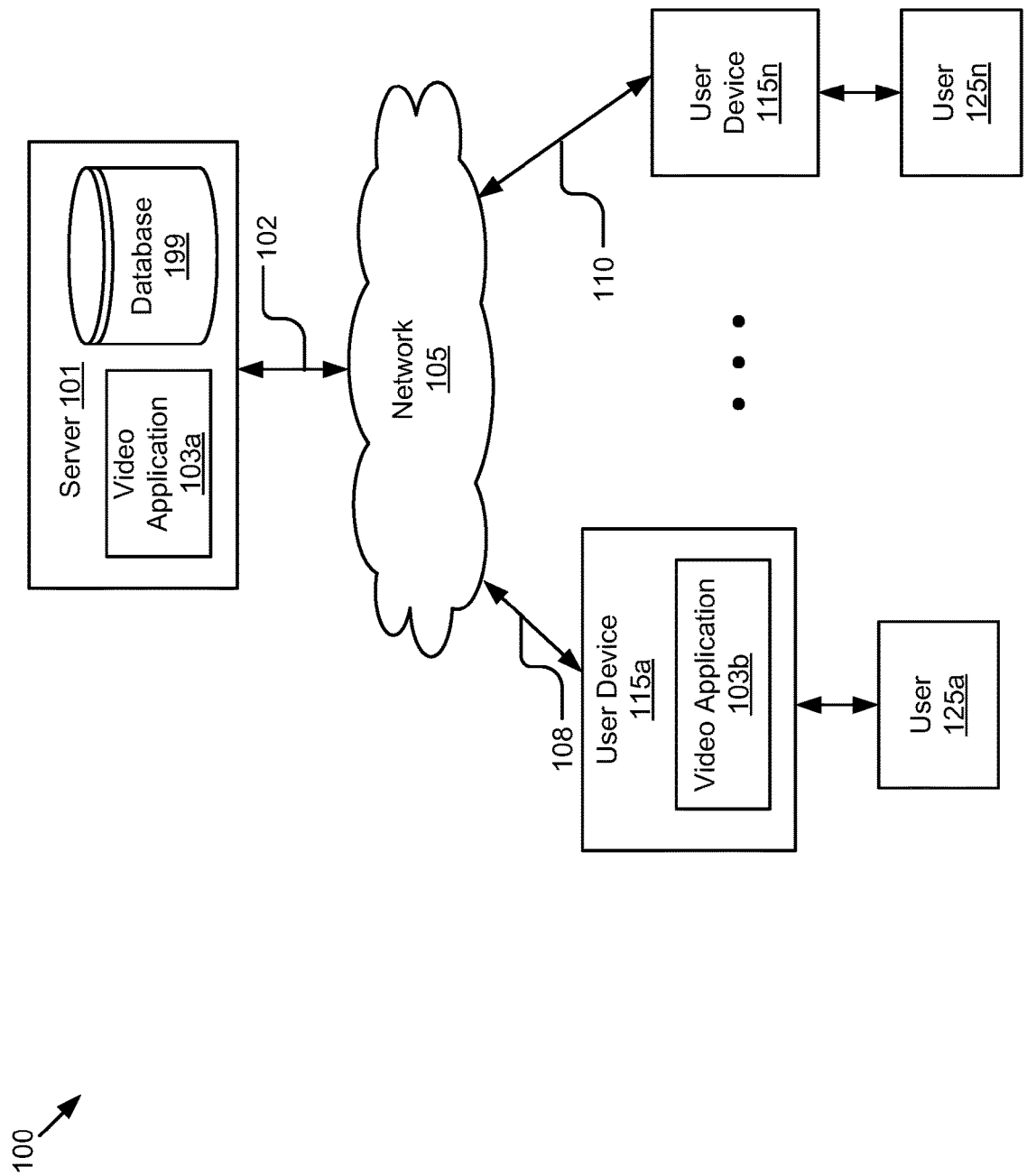
FIG. 1 illustrates a block diagram of an example system that generates a video.

FIG. 1 illustrates a block diagram of an example system 100 that generates videos. The illustrated system 100 includes a server 101, user devices 115a, 115n and a network 105. Users 125a-125n may be associated with respective user devices 115a, 115n. In some implementations, the system 100 may include other servers or devices not shown in FIG. 1. For example, the system 100 may include a separate social network server, a music server, etc. In FIG. 1 and the remaining figures, a letter after a reference number, e.g., "115a," represents a reference to the element having that particular reference number. A reference number in the text without a following letter, e.g., "115," represents a general reference to implementations of the element bearing that reference number.

In the illustrated implementation, the entities of the system 100 are communicatively coupled via a network 105. The network 105 may be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some implementations, the network 105 may be a peer-to-peer network. The network 105 may also be coupled to or include portions of a telecommunications network for sending data in a variety of different communication protocols. In some implementations, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), email, etc. Although FIG. 1 illustrates one network 105 coupled to the user devices 115 and the server 101, in practice one or more networks 105 may be coupled to these entities.

The server 101 may include a processor, a memory and network communication capabilities. In some implementations, the server 101 is a hardware server 101. The server 101 is communicatively coupled to the network 105 via signal line 102. Signal line 102 may be a wired connection, such as Ethernet, coaxial cable, fiber-optic cable, etc., or a wireless connection, such as Wi-Fi, Bluetooth, or other wireless technology.

In some implementations, the server 101 sends and receives data to and from one or more of the user devices 115a-115n via the network 105. The server 101 may include a video application 103a and a database 199.

The video application 103 may be code and routines configured to generate videos. In some implementations, the video application 103 may be implemented using hardware including a field-programmable gate array (FPGA) or an application-specific integrated circuit (ASIC). In some implementations, the video application 103 may be implemented using a combination of hardware and software.

The database 199 may store videos generated by a video application 103, such as the video application 103a stored on the server 101 or the video application 103b stored on the user device 125a. The database 199 may also store social network data associated with users 125, songs, etc.

The user device 115 may be a computing device that includes a memory and a hardware processor, for example a laptop computer, a desktop computer, a tablet computer, a mobile telephone, a wearable device, a head-mounted display, a mobile email device, a portable game player, a portable music player, a reader device, a television with one or more processors embedded therein or coupled thereto, or other electronic device capable of accessing a network 105.

In the illustrated implementation, user device 115a is coupled to the network 105 via signal line 108 and user device 115n is coupled to the network 105 via signal line 110. Signal lines 108 and 110 may be a wired connection, such as Ethernet, coaxial cable, fiber-optic cable, etc., or a wireless connection, such as Wi-Fi, Bluetooth, or other wireless technology. User devices 115a, 115n are accessed by users 125a, 125n, respectively. The user devices 115a, 115n in FIG. 1 are used by way of example. While FIG. 1 illustrates two user devices, 115a and 115n, the disclosure applies to a system architecture having one or more user devices 115.

In some implementations, the user device 115 can be a mobile device that is included in a wearable device worn by the user 125. For example, the user device 115 is included as part of a clip (e.g., a wristband), part of jewelry, or part of a pair of glasses. In another example, the user device 115 can be a smart watch. The user 125 can view videos from the video application 103 on a display of the device worn by the user 125. For example, the user 125 can view the videos on a display of a smart watch or a smart wristband.

In some implementations, the video application 103b may be stored on a user device 115a. The video application 103 may include a thin-client video application 103b stored on the user device 115a and a video application 103a that is stored on the server 101. For example, the video application 103a may be a web application that generates web pages viewable by the user device 115a using the video application 103b. In various implementations, the video application 103 may include a mobile application that runs on the user device 115a and sends information to the video application 103a stored on the server 101. For example, the user 125a may capture media using the user device 115a and transmit the media to the server 101 for the video application 103a. The video application 103a stored on the server 101 may process the information and send additional information back to the video application 103b stored on the user device 115a. For example, the video application 103a may generate a video from the media and transmit the video to the user device 115a for display. The user device 115a may stream the video directly from the server 101 or store the video on the user device 115a.

In some implementations, the video application 103 may be a standalone application stored on the server 101. A user 125a may access the web pages using a browser or other software on the user device 125a. In this implementation, the video application 103b stored on the user device 115a may receive instructions from the video application 103a stored on the server 101 to display information generated by the video application 103a. In some implementations, the video application 103 may include the same components on the user device 115a as are included on the server 101. In these implementations, a video may be generated from media items by the server 101 or by the user device 115. In these implementations, a video may be generated from media items by the server 101 or by the user device 115.

Example Computing Device

Figure 2:
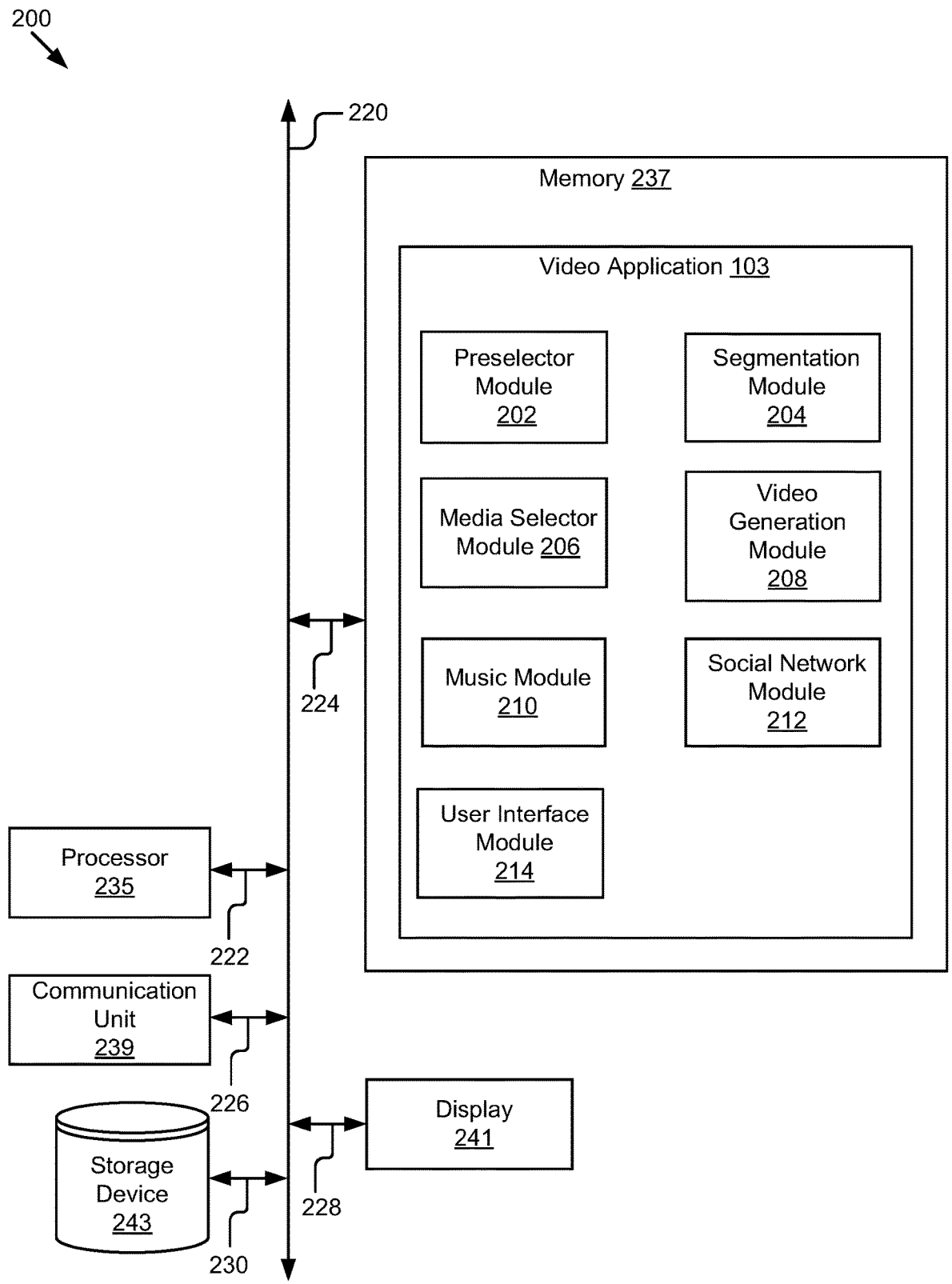
FIG. 2 illustrates a block diagram of an example computing device that generates a video.

FIG. 2 illustrates a block diagram of an example computing device 200 that generates videos. The computing device 200 may be a server 101 or a user device 115. The computing device 200 may include a processor 235, a memory 237, a communication unit 239, a display 241, and a storage device 243. A video application 103 may be stored in the memory 237. The components of the computing device 200 may be communicatively coupled by a bus 220.

The processor 235 includes an arithmetic logic unit, a microprocessor, a general purpose controller or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations may be part of the computing device 200. The processor 235 is coupled to the bus 220 for communication with the other components via signal line 222.

The memory 237 stores instructions that may be executed by the processor 235 and/or data. The instructions may include code for performing the techniques described herein. The memory 237 may be a dynamic random access memory (DRAM) device, a static RAM, or some other memory device. In some implementations, the memory 237 also includes a non-volatile memory, such as a (SRAM) device or flash memory, or similar permanent storage device and media including a hard disk drive, a floppy disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines configured to execute the video application 103, which is described in greater detail below. The memory 237 is coupled to the bus 220 for communication with the other components via signal line 224.

The communication unit 239 transmits and receives data to and from at least one of the user device 115 and the server 101 depending upon where the video application 103 may be stored. In some implementations, the communication unit 239 includes a port for direct physical connection to the network 105 or to another communication channel. For example, the communication unit 239 includes a universal serial bus (USB), secure digital (SD), category 5 cable (CAT-5) or similar port for wired communication with the user device 115 or the server 101, depending on where the video application 103 may be stored. In some implementations, the communication unit 239 includes a wireless transceiver for exchanging data with the user device 115, server 101, or other communication channels using one or more wireless communication methods, including IEEE 802.11, IEEE 802.16, Bluetooth® or another suitable wireless communication method. The communication unit 239 is coupled to the bus 220 for communication with the other components via signal line 226.

In some implementations, the communication unit 239 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some implementations, the communication unit 239 includes a wired port and a wireless transceiver. The communication unit 239 also provides other conventional connections to the network 105 for distribution of files and/or media objects using standard network protocols including, but not limited to, UDP, TCP/IP, HTTP, HTTPS, SMTP, SPDY, QUIC, etc.

The display 241 may include hardware configured to display graphical data received from the video application 103. For example, the display 241 may render graphics to display a user interface that includes a video. The display 241 is coupled to the bus 220 for communication with the other components via signal line 228. Other hardware components that provide information to a user may be included as part of the computing device 200. For example, the computing device 200 may include a speaker for audio interfaces, a vibration or force feedback device, or other types of non-display output devices. In some implementations, such as where the computing device 200 is a server 101, the display 241 may be optional. In some implementations, the computing device 200 may not include all the components. In implementations where the computing device 200 is a wearable device, the computing device 200 may not include storage device 243. In some implementations, the computing device 200 may include other components not listed here, e.g., one or more cameras, sensors, battery, etc.

The storage device 243 may be a non-transitory computer-readable storage medium that stores data that provides the functionality described herein. In implementations where the computing device 200 is the server 101, the storage device 243 may include the database 199 in FIG. 1. The storage device 243 may be a DRAM device, a SRAM device, flash memory or some other memory device. In some implementations, the storage device 243 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a permanent basis. The storage device 243 is coupled to the bus 220 for communication with the other components via signal line 230.

In the illustrated implementation shown in FIG. 2, the video application 103 includes a preselector module 202, a segmentation module 204, a media selector module 206, a video generation module 208, a music module 210, a social network module 212, and a user interface module 214. Other modules and/or configurations are possible.

The preselector module 202 may be configured to receive and transmit data. In some implementations, the preselector module 202 may be a set of instructions executable by the processor 235 to filter media items. In some implementations, the preselector module 202 may be stored in the memory 237 of the computing device 200 and can be accessible and executable by the processor 235.

In some implementations, the preselector module 202 may receive media items. The preselector module 202 may receive the media items from a user, such as when the user captures media from a user device 115, from other users that shared the media items with the user, for example, via a social network operated by the social network module 212, tagged the user in the media items, etc. Exemplary media items may include, but are not limited to, an image, a video, an animated Graphics Interchange Format (GIF) file, a photo burst series of images, a face switching series of images, and a multi-zoom series of images. An exemplary photo burst may include an animation of a fast switch between images that create a stop-motion effect. An exemplary face switching may be used to show changes in a person's face over a particular period of time. For example, the face switching may use different pictures of a baby to show how the baby has changed over the past year.

The preselector module 202 may filter the media items to remove duplicates and remove media items that fail to meet preselection criteria. The preselection criteria may include, for example, rules that require people or landmarks to be in the images (as opposed to images of documents, bills, receipts, etc.), rules against including screenshots, rules that require a threshold level of image quality, etc.

In some implementations, the preselector module 202 may determine whether media items are suitable for being used as target media based on cropping the media items. For example, the preselector module 202 may crop portions of images to identify the most salient regions of the image at a particular aspect ratio. The preselector module 202 may crop the images by cutting any combination of the top, bottom, left, or right of the image to highlight the entities or people in the image. In instances where portrait images include people, the preselector module 202 may draw bounding boxes around people in the images and determine whether the portrait images may be cropped to be converted into landscape images while keeping all the people in the image. In some implementations, the preselector module 202 may discard portrait images where the crop cuts out some of the people in the image.

The segmentation module 204 may be configured to group media items associated with a user into segments. In some implementations, the segmentation module 204 may be a set of instructions executable by the processor 235 to segment media items. In some implementations, the segmentation module 204 may be stored in the memory 237 of the computing device 200 and can be accessible and executable by the processor 235.

In some implementations, the segmentation module 204 receives filtered media items from the preselector module 202. In some implementations where the preselector module 202 is not included in the video application 103, the segmentation module 204 receives the media items. For example, the segmentation module 204 may receive the media items as described above with reference to the preselector module 202.

The segmentation module 204 may group the media items associated with a user into segments based on a timestamp associated with each media item and a total number of media items. The segmentation module 204 may use the timestamp for each media item and the total number of media items to ensure that there is sufficient time diversity of media items. For example, if the timestamps are evenly dispersed throughout a certain time period, such as a year, the segmentation module 204 may divide the media items into 12 segments where each event is associated with a particular segment. Alternatively, if timestamps for the media items indicate that there are an abundance of media items centered around one event, the segmentation module 204 may divide the media items associated with one event into multiple segments. The segmentation module 204 may determine whether to group media items associated with an event into two or more segments based on an event number of media items associated with the event as compared to the total number of media items. For example, the segmentation module 204 may determine that the media items include a "Trip to Paris" event and because 200 of the 300 media items are associated with the trip to Paris, the segmentation module 204 may group some media items associated with the trip to Paris into a first segment that includes the first two days in Paris based on the timestamps and group the other media items associated with the event into a second segment that includes the last two days in Paris based on the timestamps.

Exemplary timestamps may be associated with, but are not limited to, an upload time associated with uploading each media item, a capture time associated with capturing each media item, a creation time associated with creating each media item, and a last modification made to each media item. The segmentation module 204 may select media items from media associated with a user based on the timestamp associated with each media item being indicative of a particular time period. Exemplary time periods may include, but are not limited to, a calendar year, a birthday year, a time period of an important event (e.g., a soccer tournament), a time period of a chapter of a person's life (a wedding and the associated celebration), etc.

In some implementations, the segmentation module 204 may determine a number of target media based on a total number of media items. The segmentation module 204 may determine the number of target media before grouping the media items into segments. For example, the segmentation module 204 may determine that the number of target media is half the total number of media items.

The media selector module 206 may be configured to select target media from media items. In some implementations, the media selector module 206 may be a set of instructions executable by the processor 235 to select target media. In some implementations, the media selector module 206 may be stored in the memory 237 of the computing device 200 and can be accessible and executable by the processor 235.

In some implementations, the media selector module 206 selects target media for each segment independently, which may advantageously ensure time-diversity and reduce the time cost of selecting target media as compared to selecting target media for each segment sequentially. In some implementations, the media selector module 206 selects one to three images for each segment.

The media selector module 206 may select the target media from the media items based on media attributes associated with the media item. In some implementations, the media selector module 206 may use a training model to determine how to score the media items based on a tendency of users to share the images. For example, the media selector module 206 may compare media that were shared with other users to media that were not shared to identify media attribute differences. Based on the differences, the media selector module 206 may create a model for how to associate a share tendency score to media items.

In some implementations, the media selector module 206 may apply different rules to determine which media items should be selected as target media based on the media attributes. The rules may include different types of image processing steps. For example, in instances where the user consents to the use of such data, the media selector module 206 may perform image recognition to identify people in the media items. In some implementations, the media selector module on the rule. The media selector module 206 may determine whether the score exceeds a threshold, select the target media based on top scores, etc.

The rules may include an important entity rule that determines whether one or more important entities are present in the media item (e.g., based on experiences particular to the user, such as an image of a wooden box that the user indicates is important or experiences particular to users in general, such as an image of a birthday cake or a wedding picture). The rules may further include a landmark rule that determines whether one or more important landmarks are present in the media item (e.g., based on a popularity score associated with the entities, where the Eiffel Tower may be determined to be an important landmark). The rules may further include an important person rule that determines whether one or more important people are in the media item (e.g., based on a face frequency score). The rules may further include an important event rule that determines whether the media item corresponds to an important event based on whether a predetermined number of photos were taken during a particular time period (e.g., at least five photos were taken in an hour, based on correlating the media with an important date associated with the user, such as a birthday, anniversary, festival, trip, holiday, etc.). The rules may further include a high-visual quality rule that determines whether the media item has a visual quality that is within or exceeds a quality threshold (e.g., based on a level of blurriness, dynamic range, etc.). The rules may further include a highlight rule that determines whether the media item represents a highlight of an event. The rules may further include a socially engaged rule that determines whether one or more people in a media item are socially engaged (e.g., whether multiple people are looking at each other or looking directly at the camera versus people looking at unidentified objects, people that have vacant stares, etc.). In some implementations, in the instance where the user consents to the use of such data, the media selector module 206 performs facial recognition to identify the people in the media item and determine posture, gaze direction, and emotion of the people (e.g., based on a facial pose that indicates smiling, surprised, crying, etc.). In some implementations, the time-diversity rule that determines that target media for a segment include time diversity (e.g., the target media are not selected from a single event), a shared media rule that determines whether the media is shared from a media album, a burst for mix rule that determines a quality of a burst for different types of media, a burst for animation rule that determines a quality of a burst for animation, a burst for face switching that determines a quality of a burst that includes different faces as part of a burst, a face affinity rule that determines an affinity between the user associated with the media item and a person in the media item (e.g., in the instance where the user and the person consent to the use of such data, the affinity may be based on communications between the user and the person, such as a number of emails, texts, chats, etc. shared between the user and the person), and a face clustering rule that determines clustering of people in a media album (e.g., in the instance where the user and the person consent to the use of such data, the media selector module 206 may perform facial recognition to identify the people in the media).

In some implementations, the media selector module 206 randomly selects one of the rules from the plurality of rules according to a configured probability. For example, the media selector module 206 may use a process that employs a random or pseudorandom number generation technique to determine a rule to select from a group of rules. The media selector module 206 may determine whether the media item satisfies the rule. If the media item satisfies the rule, the media item may be selected as target media. If the media item does not satisfy the rule, the media selector module 206 may randomly select a subsequent rule. The media selector module 206 may continue this process until a threshold number of rules are selected, there are no longer subsequent rules available, or the media item satisfies one of the subsequent rules. The random selection process may be advantageous over a process where multiple rules are applied all at once because some of the rules may contradict each other. For example, the important event rule may result in selecting multiple media items from the same event. Conversely, the time-diversity rule may prohibit selecting multiple media items from the same event.

In some implementations, the media selector module 206 may rank the rules based on importance and select rules to apply to a media item based on the importance of the rules. For example, the media selector module 206 may determine, from decreasing importance, that the order of the rules is the important entity rule, the important person rule, the important event rule, the social engagement rule, the time diversity rule, and the high-visual quality rule. In some implementations, the media selector module 206 may assign a score to each rule, compute a total score for each media item that is a weighted sum of the scores, and select the media items that are associated with the best scores (e.g., the highest scores if a higher score is indicative of a media item that satisfies one or more rules). One disadvantage of the ranking approach is that the media selector module 206 selects media items as target media that somewhat satisfy many rules over media items that greatly satisfy one rule, which may result in mediocre results for the target media. In addition, it may be difficult to select appropriate weights for scoring the different types of rules.

In some implementations, the media selector module 206 selects a cover image and an ending image for the video. For example, the media selector module 206 may identify media items that satisfy multiple rules mentioned above. In some implementations, the media selector module 206 may apply different criteria when selecting the cover image and the ending image. In some implementations, the criteria when selecting the cover image and the ending image may be stricter than for the rest of the target media. For example, the cover image and the ending image may have to satisfy a first rule and subsequent rules, such as having an important entity or landmark, an important person or a group photo where the user associated with the media items is in the image, people smiling in the image, and the visual quality may include a different quality threshold value. In some implementations, the quality threshold value when selecting the cover image and the ending image may be stricter than for the rest of the target media. In some implementations, the media selector module 206 selects landscape images or images that may be cropped to form a landscape image for the cover image and the ending image.

The video generation module 208 may be configured to generate a video from the target media. In some implementations, the video generation module 208 may be a set of instructions executable by the processor 235 to generate the video. In some implementations, the video generation module 208 may be stored in the memory 237 of the computing device 200 and can be accessible and executable by the processor 235.

In some implementations, the video generation module 208 generates portions of a video from target media for each segment and combines the portions in sequence to form the video. In some implementations, the video generation module generates a video that is a sequence of the target media.

The video generation module 208 may assemble the target media into a video by creating animations of the target media that are arranged into a sequence. In particular, instead of having a slideshow that displays one photo and then fades into another photo, the video generation module 208 may generate one or more animations that include transitions between different target media items. For example, the video generation module 208 may generate an animation that includes a close-up of a first image, the animation then zooms out of the close-up of the first image to show additional portions of the first image. The animation then zooms out of the first image a second time and then the animation includes a transition from the first image to a second image, where the second image is adjacent to the first image in the animation. The animations are discussed in greater detail below with reference to FIGS. 3A-3D. Other transitions are possible, such as changing a perspective of the target media by zooming-in to emphasize important regions of the target media or an illustration of the target media moving in a particular direction (left-to-right, top-to-bottom, etc.).

In some implementations, the video generation module 208 generates a video that includes a first animation that illustrates transitions from a first item from the target media to a second item from the target media with movement of the first item from an onscreen location to an offscreen location, where the first item is adjacent to the second item. The video generation module 208 may determine whether the target media includes one or more additional items and, if there are additional items, the video generation module 208 may generate a subsequent animation that illustrates a subsequent transition from the second item to an additional item. The subsequent transition may further illustrate additional transitions between a remainder of the one or more additional items.

The video generation module 208 may add a title to the video, such as a title that describes the particular time period represented by the target media. For example, the video may be titled "Year in Review 2014," "Sara Is One," "Daniel's Graduation," etc. The video generation module 208 may determine a title for the video from a title of an album, in the instance where the user consents to the use of the data, determining a title based on calendar entries, etc.

The music module 210 may be configured to add a song to the video. In some implementations, the music module 210 may be a set of instructions executable by the processor 235 to add the song to the video. In some implementations, the music module 210 may be stored in the memory 237 of the computing device 200 and can be accessible and executable by the processor 235.

In some implementations, the music module 210 may add a song to the video, where one or more features of the song are synchronized with the video. In some implementations, the features of the song may include beats that are matched to the transitions. For example, the transition from a first media item to a second media item may be synchronized with a beat of the video. In another example, a zoom-out effect on a first item in the target media may be synchronized with a beat of the video.

In some implementations, different types of beats may be matched with the video. For example, transitions between target media items may be matched with a major beat in the song and transitions between different perspectives of a target media item (e.g., zooming-out) may be matched to a minor beat in the song. The features may also include different vocal sections, instrumental sections, quiet sections, loud sections, male voice sections, female voice sections, etc.

In some implementations, the music module 210 may use a database of songs (e.g., the database 199 in FIG. 1, the storage device 243 of FIG. 2, etc.) or retrieve songs from a third-party server that are identified to have features that synchronize with transitions in a video. For example, the music module 210 may identify songs for the database that have consistent beats at predetermined intervals, songs that are instrumental, etc. In some implementations, the music module 210 may select different songs based on a theme of the video. For example, the music module 210 may determine that the theme of a video is "Mara's Trip to Paris" based a title associated with the video, landmark recognition of the target media, etc. and match the Parisian theme with a French-inspired song. In some implementations, the music module 210 may synchronize any song selected by a user to the video.

The social network module 212 may be configured to manage a social network. In some implementations, the social network module 212 may be a set of instructions executable by the processor 235 to manage the social network. In some implementations, the social network module 212 may be stored in the memory 237 of the computing device 200 and may be accessible and executable by the processor 235. In some implementations, the social network module 212 may be excluded from the video application 103.

A social network can be a type of social structure where the users may be connected by a common feature. The common feature may include relationships/connections, e.g., friendship, family, work, an interest, etc. The common features may be provided by one or more social networking systems including explicitly defined relationships and relationships implied by social connections with other online users, where the relationships form a social graph that may be stored in the storage device 243. In some examples, the social graph can reflect a mapping of these users and how they can be related. As a result, the social network may encompass, for example, social network applications, mail applications, chat applications, and search applications.

In the instance where the user consents to the use of such data, the social network module 212 may post the video to the user's social feed. In addition, where users have consented to the use of such data, the social network module 212 may identify other people in the video that are members of the social network. For example, the social network module 212 may receive the identity of the members from the media selector module 206. The social network module 212 may associate the identity of the members with the members' profiles. The social network module 212 may then tag the members in the video and notify the members that they were tagged in the video.

The user interface module 214 may be configured to provide information to a user. In some implementations, the user interface module 214 can be a set of instructions executable by the processor 235 to provide the functionality described below for providing information to a user. In some implementations, the user interface module 214 can be stored in the memory 237 of the computing device 200 and can be accessible and executable by the processor 235.

In some implementations, the user interface module 214 may generate a user interface that allows a user to edit the video. For example, the user interface may include options that allow a user to edit the video. In some examples, the user may edit the video by adding a user-specified media item to the target media and removing one or more media items from the target media. In some examples, the user may edit the video by specifying an order of the target media in the video, editing the target media (cropping a photo, applying an enhancement to a burst, etc.), and reordering the target media in the video. In some examples, the user may edit the video by changing the song, selecting the song, and modifying the volume of the song. In some examples, the user may edit the video by changing the title. In instances where the user edits the video, the media selector module 206 may select replacement target media (if applicable), the video generation module 208 may update the video, and the music module 210 may update synchronization of the song with the updated video.

The user interface module 214 may generate a link to a network location for a user or other users (e.g., users of the social network) to access the video. For example, the user interface module 214 may generate a uniform resource locator (URL) that the user may share with other users, a landing page that any user may visit to obtain their own personalized video, etc. The user interface module 214 may further generate one or more options to share the network location, such as an email notification, a mobile callout, a share by link, an automatic notification to other users that are directly connected to the user in the social network, a post to be displayed on the user's social network, etc. In some implementations, the user interface module 214 may generate an option to download the video.

In some implementations, the user interface module 214 may generate a preview of the video that includes highlights of the video. For example, the preview may include the cover image, the end image, and 12 target media items that are static images and that satisfy the rules. In some implementations, the target media for the preview may satisfy a more strict set of criteria than the target media for the video. For example, the target media for the preview may be selected from the best scored target media from the video. In some implementations, the preview may be automatically added to a user's media library (on the cloud, on their phone, etc.).

Example Graphic Representations of Animations

Figure 3A:
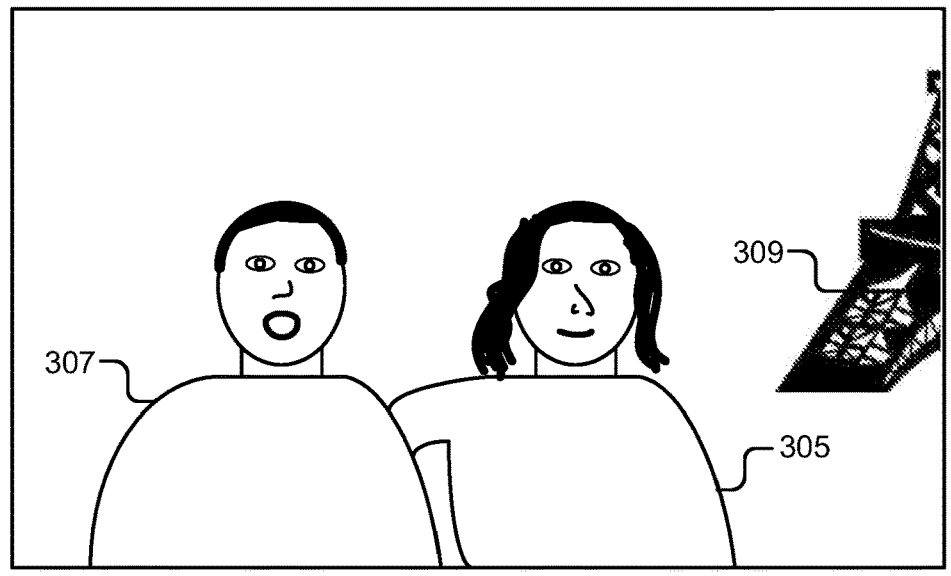
FIG. 3A illustrates a graphic representation of a first portion of an animation.

FIGS. 3A-3D illustrates graphic representations of an animation generated by the video generation module 208. FIG. 3A illustrates a graphic representation 300 of a first portion of an animation. In this example, the graphic representation 300 is a close-up of a user 305 and a friend 307 of the user. Because the graphic representation 300 is a cover image, the graphic representation 300 satisfies multiple rules as determined by the media selector module 206. For example, the media selector module 206 determines that the cover image includes the user, the cover image includes a person with a high face affinity score based on frequent communications between the person and the user (with consent from the user), the cover image includes an important landmark 309, and the quality of the image meets a threshold quality value.

Figure 3B:
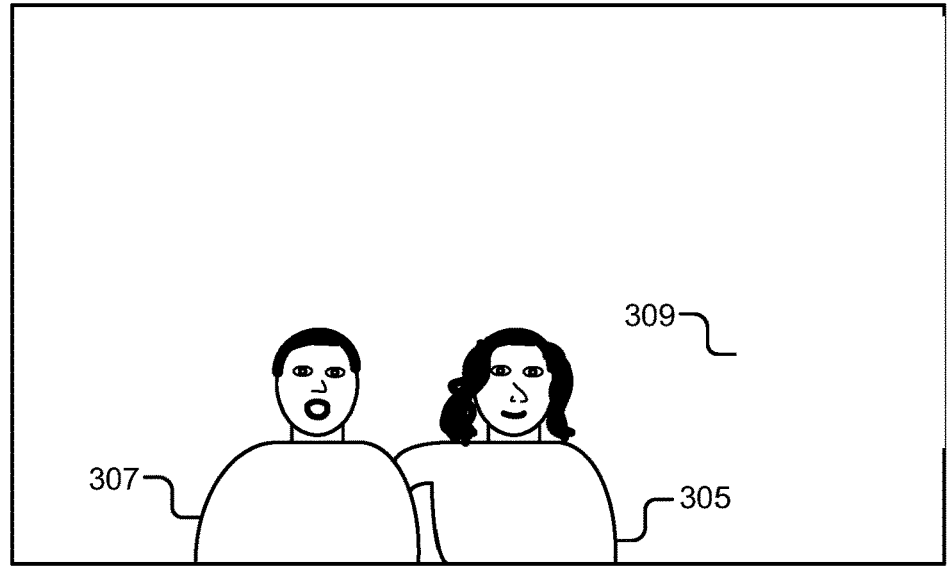
FIG. 3B illustrates a graphic representation of a second portion of the animation.

FIG. 3B illustrates a graphic representation 325 of a second portion of the animation. In this example, the animation includes a first transition from the close-up of the user 305 and the friend 307 as illustrated in FIG. 3A to a zoomed-out version of the cover image as illustrated in FIG. 3B. In this graphic representation 325 the important landmark 309 is identifiable as the Eiffel Tower.

Figure 3C:
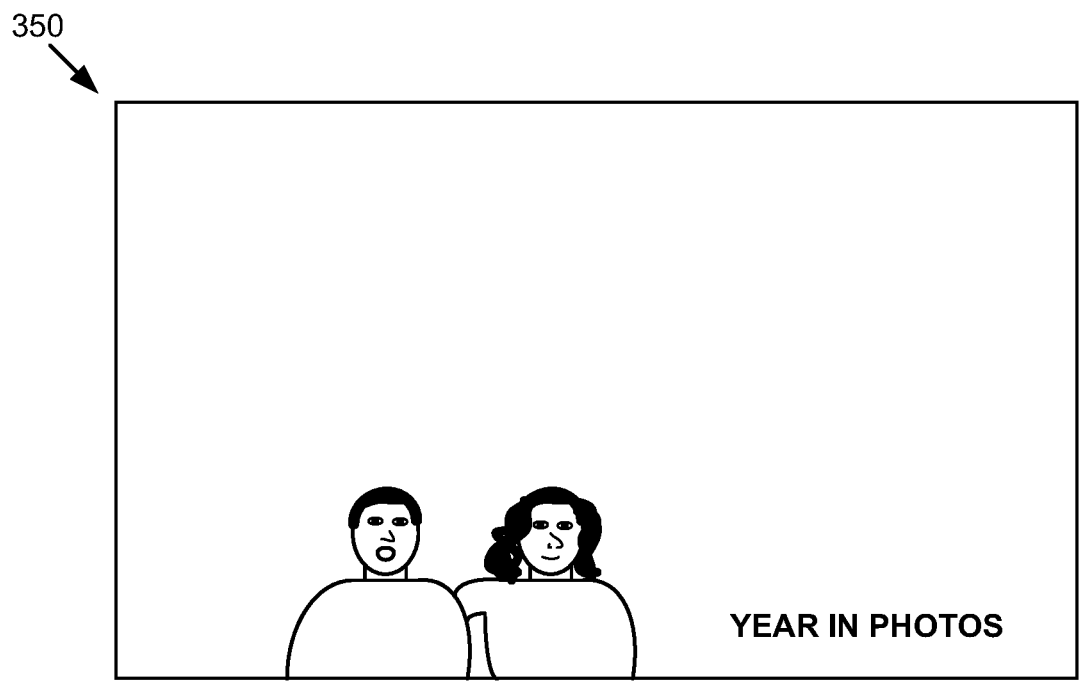
FIG. 3C illustrates a graphic representation of a third portion of the animation.

FIG. 3C illustrates a graphic representation 350 of a third portion of the animation. In this example, the animation includes a second transition from the close-up of the user 305, the friend 307, and the important landmark 309 as illustrated in FIG. 3B to a zoomed-out version of the cover image as illustrated in FIG. 3C. The graphic representation 350 also includes a title for the cover image that indicates that the subject matter of the video is the year in photos.

Figure 3D:
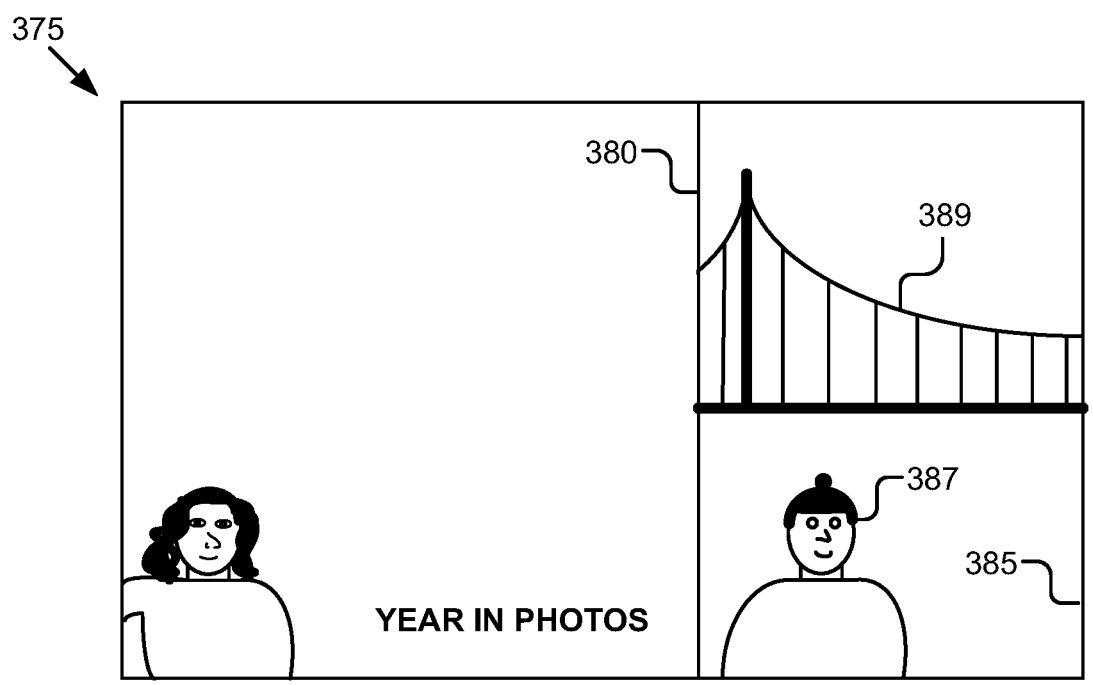
FIG. 3D illustrates a graphic representation of a fourth portion of the animation.

FIG. 3D illustrates a graphic representation 375 of a fourth portion of the animation. In this example, the animation includes a third transition from the cover image 380 to a second item 385. The third transition is illustrated as the cover image 380 being adjacent to the second item 385 with movement from the right to the left as the cover image 380 moves from an onscreen location to an offscreen location. The second item is illustrated as including another friend 387 of the user in front of another important landmark 389, which the media selector module 206 identified as the Zakim Bridge in Boston.

In some implementations, the first two transitions may be synchronized to a different feature of the song than the third transition. This may be advantageous, for example, for the user to distinguish between different types of transitions, such a zoom-out transition (e.g., the first two transitions) and a horizontal movement (e.g., the third transition).

Example Methods

Figure 4:
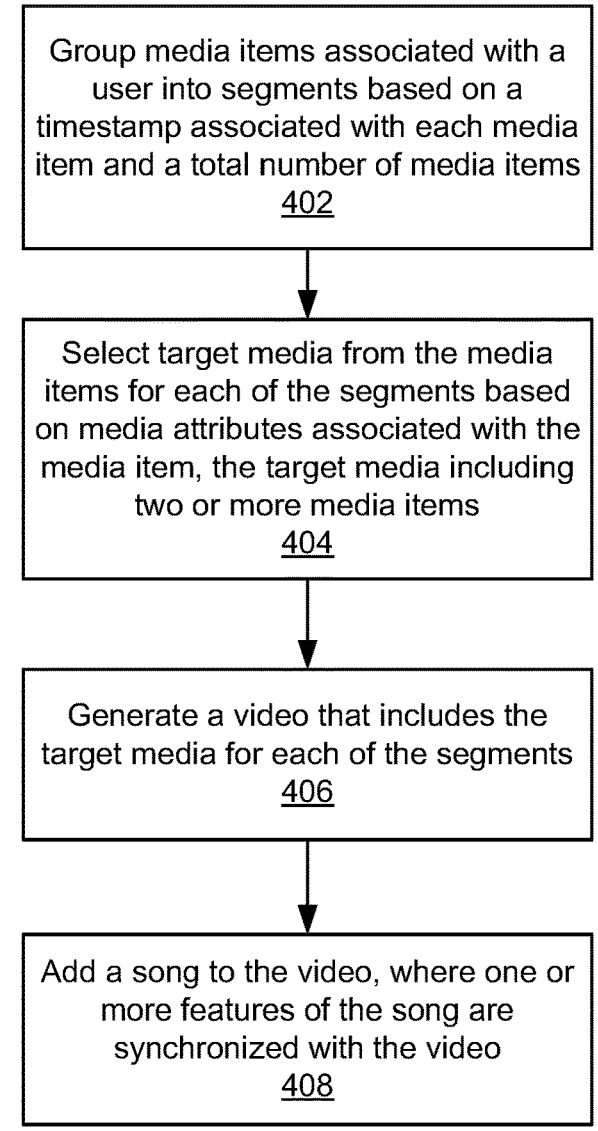
FIG. 4 is a flowchart of an example method to generate a video.

FIG. 4 is a flowchart of an example method 400 to generate a video. The method 400 may be implemented by server 101, a user device 115 or a combination of the server 101 and the user device 115, using the video application 103 illustrated in FIG. 1. The video application 103 may include the segmentation module 204, the media selector module 206, the video generation module 208, and the music module 210 illustrated in FIG. 2.

At block 402, media items associated with a user are grouped into segments based on a timestamp associated with each media item and a total number of media items. For example, the segmentation module 204 may group the media items associated with the user into segments based on the timestamp data and the total number of media items. In some implementations, if the timestamp data and the total number of media items indicate a time diversity in the media items, the segmentation module 204 may group the media items into segments where a single event represented in the media items are part of one of the segments. For example, images of a user's birthday party may be associated with a single segment. In other implementations, if there is a lack of time diversity in the media items, a single event represented in the media items may span two or more segments. For example, a user's trip to Paris may be associated with two segments.

At block 404, target media is selected from the media items for each of the segments based on media attributes associated with the media attributes associated with the media item, the target media including two or more media items. For example, the media selector module 206 may select the target media. The target media may be selected based on rules as described with reference to FIG. 5.

At block 406, a video is generated that includes the target media for each of the segments. For example, the video generation module 208 may generate the video. The video includes animations as described in greater detail below with reference to FIG. 6.

At block 408, a song is added to the video, where one or more features of the song are synchronized with the video. For example, the music module 210 may add the song to the video. In some examples, the one or more features may include beats that are synchronized to transitions in the video.

While blocks 402 to 408 are illustrated in a particular order, other orders are possible with intervening steps. In some implementations, some blocks may be added, skipped, or combined.

Figure 5:
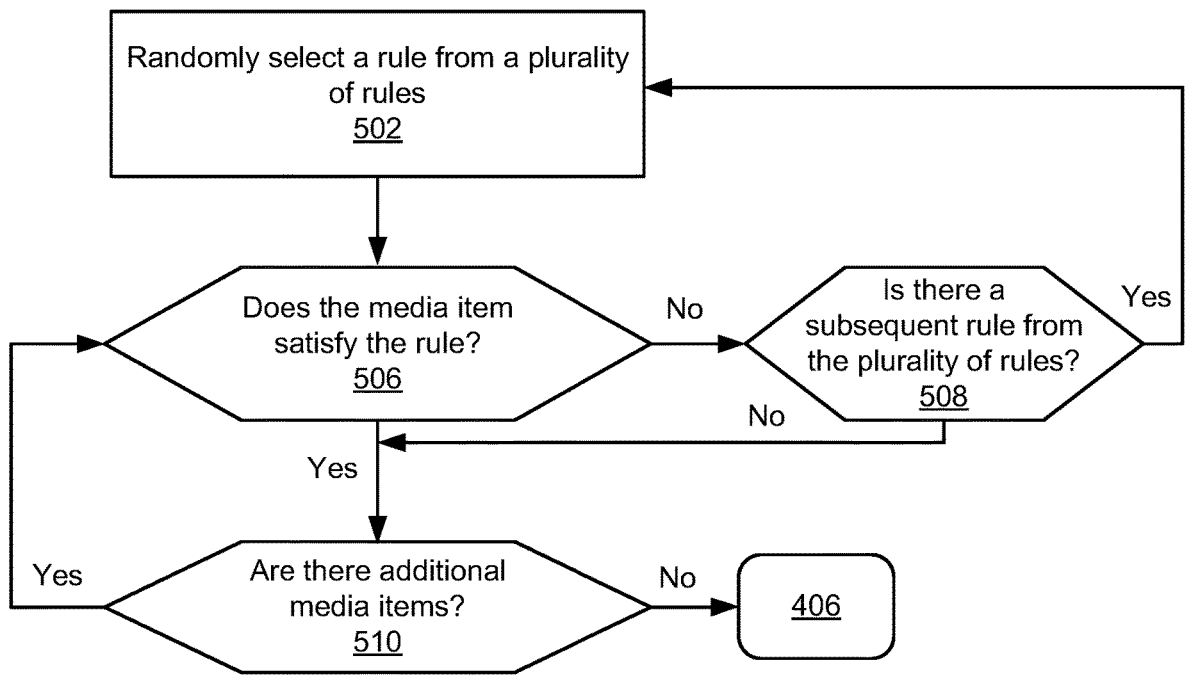
FIG. 5 is a flowchart of an example method to select target media from media items.

FIG. 5 is a flowchart of an example method 500 to select target media from media items. The method 500 may be implemented by server 101, a user device 115 or a combination of the server 101 and the user device 115, using the video application 103 illustrated in FIG. 1. The video application 103 may include the media selector module 206 illustrated in FIG. 2.

At block 502, a rule may be randomly selected from a plurality of rules. For example, the media selector module 206 may randomly select the rule from the plurality of rules. The rule may be randomly selected according to a probability associated with the rule (e.g., a weight associated with each of the rules).

At block 504, it is determined whether the media item satisfies the rule. For example, the media selector module 206 determines whether the media item satisfies the rule. The rule may be satisfied by applying a score to the media item based on media attributes being analyzed based on the rule and determining whether the score exceeds a threshold value. Responsive to a determination that the media item does not satisfy the rule, the method 500 proceeds to block 508 where it is determined whether there is a subsequent rule from the plurality of rules. For example, the media selector module 206 determines where there is a subsequent rule. Responsive to a determination that the subsequent rule is present, the method 500 proceeds to block 502. Responsive to a determination that there is not a subsequent rule from the plurality of rules, the method 500 proceeds to block 510.

Responsive to the media item satisfying the rule, the method 500 proceeds to block 510. At block 510, it is determined whether there are additional media items. For example, the media selector module 206 determines whether there are additional media items. Responsive to determining that there are additional media items, the method 500 proceeds to block 506. Responsive to determining that there are not additional media items, the method 500 proceeds to block 406 of FIG. 4.

While blocks 502 to 510 are illustrated in a particular order, other orders are possible with intervening steps. In addition, blocks may be added, skipped, or combined.

Figure 6:
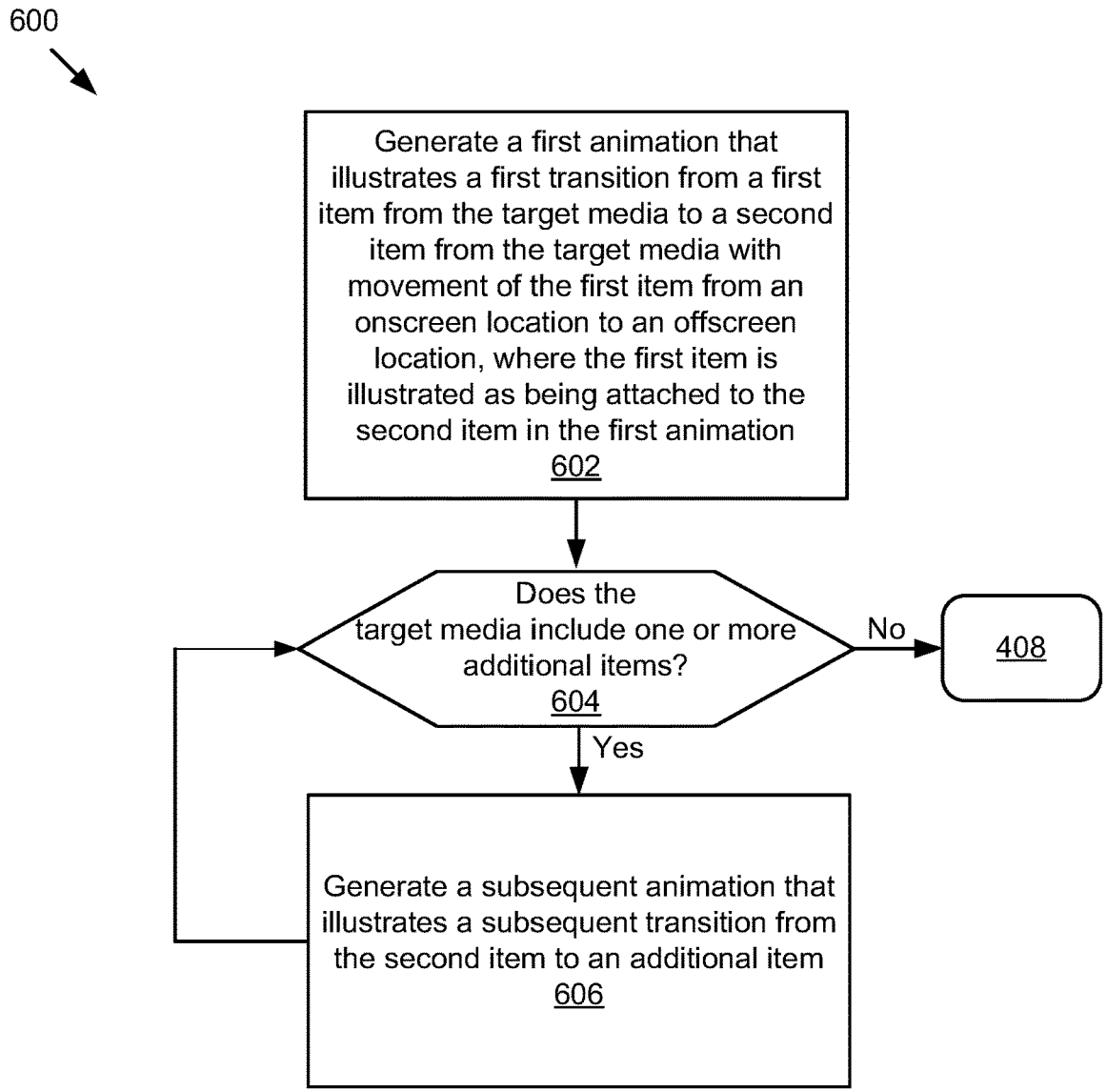
FIG. 6 is a flowchart of an example method to generate an animation with two or more transitions.

FIG. 6 is a flowchart of an example method 600 to generate an animation with two or more transitions. The method 600 may be implemented using the video application 103 illustrated in FIG. 1. The video application 103 may include the video generation module 208 illustrated in FIG. 2.

At block 602, a first animation is generated that illustrates a first transition from a first item from the target media to a second item from the target media with movement of the first item from an onscreen location to an offscreen location, where the first item is adjacent to the second item in the first animation. For example, the video generation module 208 generates the first animation.

At block 604, it is determined whether the target media includes one or more additional items. For example, the video generation module 208 determines whether the target media includes the one or more additional items. Responsive to a determination that the target media does not include the one or more additional items, the method 600 proceeds to block 408 of FIG. 4. Responsive to the target media including the one or more additional items, the method 600 proceeds to block 606.

At block 606, a subsequent animation is generated that illustrates a subsequent transition from the second item to an additional item. For example, the video generation module 208 generates the subsequent animation. The method proceeds to block 604 and continues in a loop until there are no longer additional items in the target media.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the implementations can be described above primarily with reference to user interfaces and particular hardware. However, the implementations can apply to any type of computing device that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The implementations of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including floppy disks, optical disks, ROMs, CD-ROMs, magnetic disks, RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

In situations in which the systems discussed above collect personal information, the systems provide users with an opportunity to control whether programs or features collect user information (e.g., information about a user's social network, social actions or activities, profession, a user's preferences, or a user's current location), or control whether and/or how to receive content from the server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the server.

What is claimed is:

1. A computer-implemented method to generate a video, the method comprising:
    grouping media items associated with a user into segments;
    selecting target media from the media items for each of the segments based on media attributes associated with the media items, wherein the target media includes two or more of the media items;
    generating the video that includes the target media for each of the segments by:
        illustrating a first transition from a first media item from the target media to a second media item from the target media with movement of the first media item from an onscreen location to an offscreen location;
        determining whether the target media includes one or more additional media items; and
        responsive to determining that the target media includes one or more additional media items, illustrating a second transition from the second media item to a first additional item and that further illustrates additional transitions between a remainder of the one or more additional media items; and
    adding a song to the video, wherein one or more features of the song are synchronized with the video.

2. The method of claim 1, wherein:
    grouping the media items associated with the user into segments is based on a respective timestamp associated with the media items; and
    the respective timestamp associated with each media item represents at least one of an upload time associated with uploading the media item, a capture time associated with capture of the media item, a creation time associated with the media item, or a last modification time associated with the media item.

3. The method of claim 1, wherein grouping the media items associated with the user into segments is based on the media items including a face of the user and at least one additional face.

4. The method of claim 1, wherein illustrating the first transition further comprises:
    illustrating a zoom-out effect on the first media item, wherein the zoom-out effect is synchronized to the one or more features of the song.

5. The method of claim 1, wherein grouping the media items associated with the user into the segments includes grouping media items associated with an event into two or more segments based on an event number of media items associated with the event as compared to a total number of media items.

6. The method of claim 1, wherein selecting the target media from the media items for each of the segments based on the media attributes associated with the media items includes selecting based on a share tendency associated with each of the media items.

7. The method of claim 1, wherein grouping the media items is based on one or more of the media items being associated with a landmark score that meets a threshold value, wherein the landmark score that meets the threshold value indicates that an important landmark is depicted in the one or more of the media items.

8. A system to generate a video, the system comprising:
    one or more processors coupled to a memory;
    a media selector module stored in the memory and executable by the one or more processors, the media selector module executable by the one or more processors to:
        group media items associated with a user into segments;
        select target media from the media items for each of the segments based on media attributes associated with the media items, wherein the target media includes two or more of the media items;
    a video generation module stored in the memory and coupled to the media selector module, the video generation module executable by the one or more processors to:
        generate the video that includes the target media for each of the segments by:
            illustrating a first transition from a first media item from the target media to a second media item from the target media with movement of the first media item from an onscreen location to an offscreen location;
            determining whether the target media includes one or more additional media items; and
            responsive to determining that the target media includes one or more additional media items, illustrating a second transition from the second media item to a first additional item and that further illustrates additional transitions between a remainder of the one or more additional media items; and
    a music module stored on the memory and executable by the one or more processors to add a song to the video, wherein one or more features of the song are synchronized with the video.

9. The system of claim 8, wherein:
    grouping the media items associated with the user into segments is based on a respective timestamp associated with the media items; and
    the respective timestamp associated with each media item represents at least one of an upload time associated with uploading the media item, a capture time associated with capture of the media item, a creation time associated with the media item, or a last modification time associated with the media item.

10. The system of claim 8, wherein grouping the media items associated with the user into segments is based on the media items including a face of the user and at least one additional face.

11. The system of claim 8, wherein illustrating the first transition further comprises:
   illustrating a zoom-out effect on the first media item, wherein the zoom-out effect is synchronized to the one or more features of the song.

12. The system of claim 8, wherein grouping the media items associated with the user into the segments includes grouping media items associated with an event into two or more segments based on an event number of media items associated with the event as compared to a total number of media items.

13. The system of claim 8, wherein selecting the target media from the media items for each of the segments based on the media attributes associated with the media items includes selecting based on a share tendency associated with each of the media items.

14. The system of claim 8, wherein grouping the media items is based on one or more of the media items being associated with a landmark score that meets a threshold value, wherein the landmark score that meets the threshold value indicates that an important landmark is depicted in the one or more of the media items.

15. A non-transitory computer storage medium encoded with a computer program, the computer program comprising instructions that, when executed by one or more computers, cause the one or more computers generate a video by performing operations comprising:
   grouping media items associated with a user into segments;
   selecting target media from the media items for each of the segments based on media attributes associated with the media items, wherein the target media includes two or more of the media items;
   generating the video that includes the target media for each of the segments by:
      illustrating a first transition from a first media item from the target media to a second media item from the target media with movement of the first media item from an onscreen location to an offscreen location;
      determining whether the target media includes one or more additional media items; and
      responsive to determining that the target media includes one or more additional media items, illustrating a second transition from the second media item to a first additional item and that further illustrates additional transitions between a remainder of the one or more additional media items; and
   adding a song to the video, wherein one or more features of the song are synchronized with the video.

16. The computer storage medium of claim 15, wherein:
   grouping the media items associated with the user into segments is based on a respective timestamp associated with the media items; and
   the respective timestamp associated with each media item represents at least one of an upload time associated with uploading the media item, a capture time associated with capture of the media item, a creation time associated with the media item, or a last modification time associated with the media item.

17. The computer storage medium of claim 15, wherein grouping the media items associated with the user into segments is based on the media items including a face of the user and at least one additional face.

18. The computer storage medium of claim 15, wherein illustrating the first transition further comprises:
   illustrating a zoom-out effect on the first media item, wherein the zoom-out effect is synchronized to the one or more features of the song.

19. The computer storage medium of claim 15, wherein grouping the media items associated with the user into the segments includes grouping media items associated with an event into two or more segments based on an event number of media items associated with the event as compared to a total number of media items.

20. The computer storage medium of claim 15, wherein selecting the target media from the media items for each of the segments based on the media attributes associated with the media items includes selecting based on a share tendency associated with each of the media items.

* * * * *